US009586636B1

(12) United States Patent
Burmeister et al.

(10) Patent No.: US 9,586,636 B1
(45) Date of Patent: Mar. 7, 2017

(54) MULTI-SEGMENTED MAGNETIC ROBOT

(71) Applicant: The United States of America as represented by the Secretary of the Navy, Washington, DC (US)

(72) Inventors: Aaron Burmeister, San Diego, CA (US); Kurt Talke, San Diego, CA (US); Abraham Hart, San Diego, CA (US); Narek Pezeshkian, Glendale, CA (US); Saam Ostovari, San Diego, CA (US); Leah C. Kelley, Cambridge, MA (US)

(73) Assignee: THE UNITED STATES OF AMERICA AS REPRESENTED BY THE SECRETARY OF THE NAVY, Washington, DC (US)

( * ) Notice: Subject to any disclaimer, the term of this patent is extended or adjusted under 35 U.S.C. 154(b) by 0 days.

(21) Appl. No.: 14/749,433

(22) Filed: Jun. 24, 2015

Related U.S. Application Data

(60) Provisional application No. 62/069,684, filed on Oct. 28, 2014.

(51) Int. Cl.
*B62D 57/024* (2006.01)
*B62D 49/06* (2006.01)
*B62D 53/02* (2006.01)

(52) U.S. Cl.
CPC ....... *B62D 57/024* (2013.01); *B62D 49/0621* (2013.01); *B62D 53/028* (2013.01); *Y10S 901/01* (2013.01)

(58) Field of Classification Search
CPC . B62D 57/024; B62D 57/028; B62D 49/0621
(Continued)

(56) References Cited

U.S. PATENT DOCUMENTS 3,437,786 A    4/1969   Colinet
3,690,393 A *  9/1972   Guy ................. A63H 18/10
                                                 105/77

(Continued)

FOREIGN PATENT DOCUMENTS

CN   102039592        5/2012
CN   103009373    * 12/2013  .......... B62D 57/024
JP    02095989 A  *  4/1990

OTHER PUBLICATIONS

Tâche, F., Fischer, W., Siegwart, R., Moser, R. and Mondada, F., "Compact magnetic wheeled robot with high mobility for inspecting complex shaped pipe structures," IEEE/RSJ Int. Conf. on Intelligent Robots and Systems (IROS) 2007, 261-266 (2007).

(Continued)

*Primary Examiner* — Kevin Hurley
*Assistant Examiner* — Gabriela C Craciun
(74) *Attorney, Agent, or Firm* — SPAWAR Systems Center Pacific; Kyle Eppele; Ryan J. Friedl

(57) ABSTRACT

A system includes a first drive module connected to a first end of a linkage arm and a second drive module connected to a second end of the linkage arm. Two magnetic wheels are connected to each of the first and second drive modules. The first and second drive modules may be independently controlled or controlled using a coordinated controller. The linkage arm may include a first linkage arm portion having at least one degree of freedom with respect to a connected second linkage arm portion, which may be connected via a hinged or ball-joint connection. One or both ends of the linkage arm may have at least one degree of freedom with respect to its respectively connected drive module. Additional linkage arms and drive modules may be connected to form a multi-segment system.

20 Claims, 16 Drawing Sheets

(58) Field of Classification Search
USPC .......................................................... 180/901
See application file for complete search history.

(56) References Cited

U.S. PATENT DOCUMENTS

| | | | | |
|---|---|---|---|---|
| 4,095,378 | A * | 6/1978 | Urakami | B24C 3/062 114/222 |
| 4,977,971 | A * | 12/1990 | Crane, III | B62D 55/075 180/8.3 |
| 5,161,631 | A * | 11/1992 | Urakami | B24C 3/06 180/164 |
| 5,284,096 | A * | 2/1994 | Pelrine | B62D 49/04 104/138.2 |
| 5,355,807 | A * | 10/1994 | Pelrine | B62D 57/024 104/138.2 |
| 5,363,935 | A | 11/1994 | Schempf | |
| 5,551,525 | A * | 9/1996 | Pack | B62D 57/032 180/8.1 |
| 5,752,577 | A * | 5/1998 | Urakami | B62D 57/00 180/164 |
| 5,894,901 | A | 4/1999 | Awamura | |
| 5,921,337 | A * | 7/1999 | Okamoto | E02F 9/028 180/41 |
| 6,000,484 | A * | 12/1999 | Zoretich | B05B 13/005 180/21 |
| 6,125,955 | A * | 10/2000 | Zoretich | B60B 19/006 152/44 |
| 6,267,196 | B1 * | 7/2001 | Wilcox | B60K 17/36 180/209 |
| 6,691,811 | B2 * | 2/2004 | Bruntrup | A47L 1/02 114/222 |
| 6,742,617 | B2 * | 6/2004 | Jeswine | B62D 49/0621 180/164 |
| 6,793,026 | B1 * | 9/2004 | De Fazio | A63H 11/04 180/8.3 |
| 7,011,171 | B1 * | 3/2006 | Poulter | B60B 15/023 180/65.1 |
| 7,233,221 | B2 * | 6/2007 | Reboredo Losada | B60B 3/048 105/78 |
| 8,393,422 | B1 * | 3/2013 | Pensel | B62D 55/0655 180/9.4 |
| 8,464,815 | B2 * | 6/2013 | Niederberger | B62D 57/024 180/164 |
| 8,540,044 | B2 * | 9/2013 | Ba-abbad | A62C 27/00 180/164 |
| 8,935,014 | B2 * | 1/2015 | Jacobsen | F41H 13/00 700/245 |
| 2010/0139995 | A1 * | 6/2010 | Rudakevych | B62D 55/06 180/9.32 |
| 2010/0263948 | A1 * | 10/2010 | Couture | B25J 5/005 180/8.2 |
| 2011/0050374 | A1 * | 3/2011 | Dvorak | A63H 17/42 335/219 |
| 2011/0240382 | A1 * | 10/2011 | Gettings | B62D 55/075 180/9.1 |
| 2013/0289766 | A1 * | 10/2013 | Hafenrichter | B25J 9/02 700/245 |
| 2014/0110021 | A1 * | 4/2014 | Divine | A01G 23/0955 144/24.13 |
| 2015/0019103 | A1 * | 1/2015 | Choi | B60T 8/172 701/82 |
| 2015/0081092 | A1 * | 3/2015 | Jacobsen | B25J 9/065 700/245 |
| 2015/0153170 | A1 * | 6/2015 | Gonzalez | G01B 21/22 701/300 |
| 2015/0153312 | A1 * | 6/2015 | Gonzalez | G01D 5/00 73/23.2 |

OTHER PUBLICATIONS

Tâche, F., Fischer, W., Caprari, G., Siegwart, R., Moser, R. and Mondada, F., "Magnebike: A magnetic wheeled robot with high mobility for inspecting complex-shaped structures," Journal of Field Robotics, 26, 453-476 (2009).

Eich, M. and Vogele, T., "Design and control of a lightweight magnetic climbing robot for vessel inspection," 19th Mediterranean Conf. on Control & Automation (MED), 1200-1205 (2011).

Eiammanussakul, T., Taoprayoon, J. and Sangveraphunsiri, V., "Weld Bead Tracking Control of a Magnetic Wheel Wall Climbing Robot Using a Laser-Vision System," Applied Mechanics and Materials, 219-223 (2014).

Yi, Z., Gong, Y., Wang, Z. and Wang, X., "Development of a wall climbing robot for ship rust removal," Int. Conf. on Mechatronics and Automation (ICMA), 4610-4615 (2009).

Leon-Rodriguez, H., Hussain, S. and Sattar, T., "A compact wall-climbing and surface adaptation robot for nondestructive testing," 12th Int. Conf. on Control, Automation and Systems (ICCAS), 404-409 (2012).

Fernández, R., González, E., Feliú, V. and Rodríguez, A. G., "A wall climbing robot for tank inspection. An autonomous prototype," in 36th Annual Conf. on IEEE Industrial Electronics Society, 1424-1429 (2010).

Kitai, S., Tsuru, K. and Hirose, S., "The proposal of swarm type wall climbing robot system 'Anchor Climber'—the design and examination of adhering mobile unit," IEEE/RSJ Int. Conf. on Intelligent Robots and Systems (IROS), 475-480 (2005).

Silva, M. F., Barbosa, R. S. and Oliveira, A. L. C., "Climbing Robot for Ferromagnetic Surfaces with Dynamic Adjustment of the Adhesion System," Journal of Robotics, 2012, (2012).

Lee, G., Seo, K., Lee, S., Park, J., Kim, H., Kim, J. and Seo, T., "Compliant track-wheeled climbing robot with transitioning ability and high-payload capacity," 2011 IEEE Int. Conf. on Robotics and Biomimetics (ROBIO), 2020-2024 (2011).

Espinoza, R. V., de Oliveira, A. S., de Arruda, L. V. R. and Neves Junior, F., "Navigation's Stabilization System of a Magnetic Adherence-Based Climbing Robot," Journal of Intelligent & Robotic Systems, 1-17 (2014).

Lee, G., Wu, G., Kim, S. H., Kim, J. and Seo, T., "Combot: Compliant climbing robotic platform with transitioning capability and payload capacity," 2012 IEEE Int. Conf. on Robotics and Automation (ICRA), 2737-2742 (2012).

Wang, H., Huang, X., Hong, R. and Fang, C., "A new inspection robot system for storage tank," 7th World Congress on Intelligent Control and Automation (WCICA), 7427-7431 (2008).

Lee, W., "Proposition of reconfigurable wall climbing robot using 6DOF force torque sensor based on flexible structure for real environment," 13th Int. Conf. on Control, Automation and Systems (ICCAS), 1802-1806 (2013).

Erdmann, C. R., "080727-N-4236E-155," United States Navy, <http://www.navy.mil/view_image.asp?id=62050> (2008).

Burmeister, A., Pezeshkian, N., Talke, K., Ostovari, S., Everett, H.R., Hart, A., Gilbreath, G. and Nguyen, H.G., "Design of a Multi-Segmented Robot for Hull Inspection," Naval Engineers Journal, 126-3, 53-60 (2014).

Kamegawa, T., Yarnasaki, T., Igarashi, H. and Matsuno, F., "Development of the snake-like rescue robot 'kohga'," IEEE Int. Conf. on Robotics and Automation (ICRA '04), 5081-5086 (2004).

Laumond, J. P., Sekhavat, S. and Lamiraux, F., "Guidelines in nonholonomic motion planning for mobile robots," Robot Motion Planning and Control, 229, 1-53 (1998).

Tanaka, M. and Matsuno, F., "Experimental Study of Redundant Snake Robot Based on Kinematic Model," 2007 IEEE Int. Conf. on Robotics and Automation, 2990-2995 (2007).

Michatek, M. M., "A highly scalable path-following controller for N-trailers with off-axle hitching," Control Engineering Practice, 29, 61-73 (2014).

Matsuno, F. and Suenaga, K., "Control of redundant snake robot based on kinematic model," Proc. 41st SICE Annual Conference, 3, 1481-1486 (2002).

Tilbury, D. Laumond, J. P., Murray, R., Sastry, S. and Walsh, G., "Steering car-like systems with trailers using sinusoids," 1992 IEEE Int. Conf. on Robotics and Automation, 3, 1993-1998 (1992).

Laumond, J. P., "Controllability of a multibody mobile robot," IEEE Transactions on Robotics and Automation, 9, 755-763 (1993).

(56) References Cited

OTHER PUBLICATIONS

Lamiraux, F., Sekhavat, S. and Laumond, J. P., "Motion planning and control for Hilare pulling a trailer," IEEE Transactions on Robotics and Automation, 15, 640-652 (1999).
Lee, J.-H., Chung, W., Kim, M. and Song, J.-B., "A passive multiple trailer system with off-axle hitching," Int. Journal of Control Automation and Systems, 2, 289-297 (2004).
Nakamura, Y., Ezaki, H., Tan, Y. and Chung, W., "Design of steering mechanism and control of nonholonomic trailer systems," IEEE Transactions on Robotics and Automation, 17, 367-374 (2001).
Sampei, M., Tamura, T., Itoh, T. and Nakamichi, M., "Path tracking control of trailer-like mobile robot," Proc. IEEE/RSJ Int. Workshop on Intelligent Robots and Systems: Intelligence for Mechanical Systems (IROS '91), 1, 193-198 (1991).
Yuan, J., Huang, Y., Kang, Y. and Liu, Z., "A Strategy of Path Following Control for Multi-Steering Tractor-Trailer Mobile Robot," IEEE Int. Conf. on Robotics and Biomimetics (ROBIO 2004), 163-168 (2004).
Kerber, M., et al., "Design of a Multi-Segmented Robot for Hull Climbing", SPAWAR Systems Center Pacific (SSC Pacific) Technical report 2028, San Diego, CA, Nov. 2013.
Kerber, M., et al., "Design and Optimization of a Magnetic Wheel for Hull Climbing", SPAWAR Systems Center Pacific (SSC Pacific) Technical report 2025, San Diego, CA, Nov. 2013.
Magnetic wheels, available at http://www.davehylands.com/Robotics/Wedgy/07-Magnetic-Wheel.html.
Gecko—Magnetic Wall Climbing Robot, available at http://www.instructables.com/id/Gecko-Magnetic-wall-climbing-robot/.

\* cited by examiner

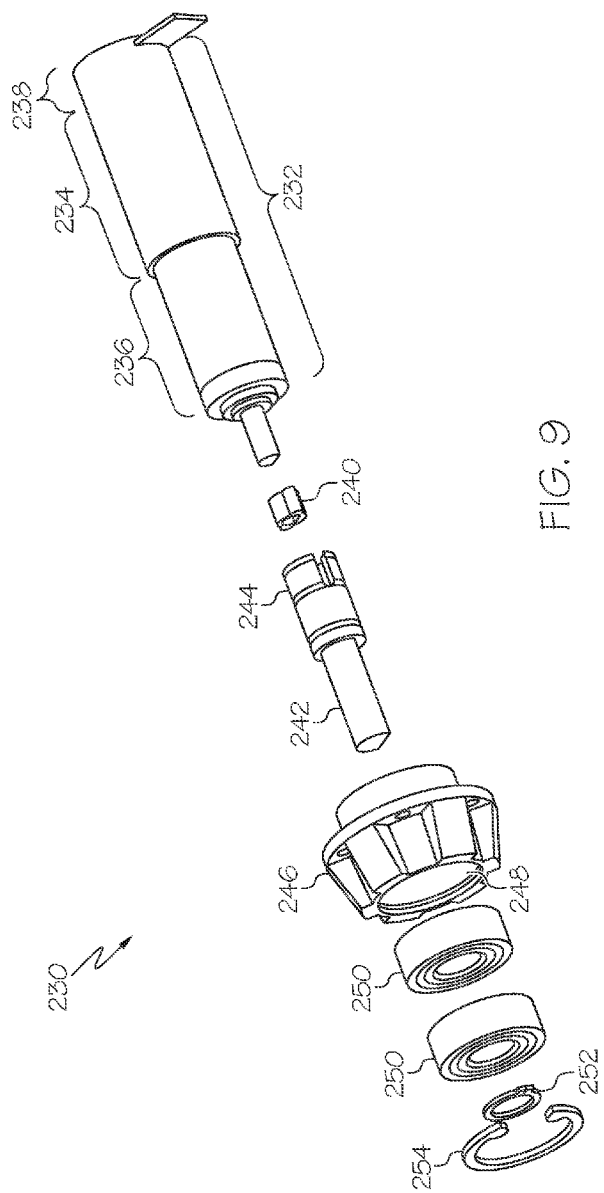

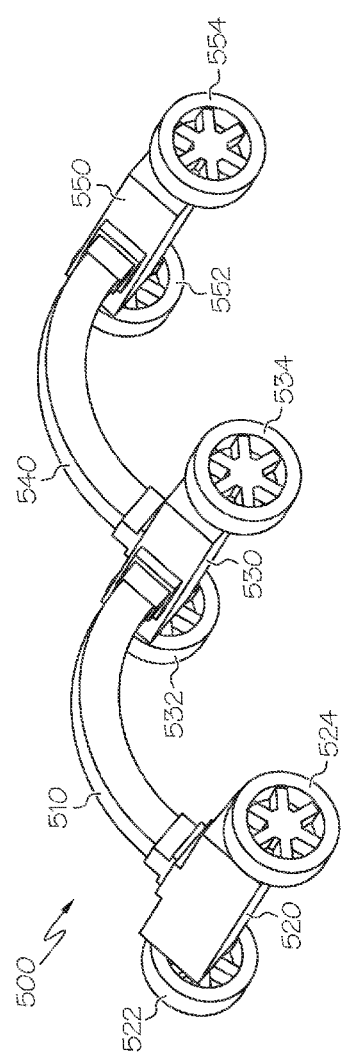
FIG. 13
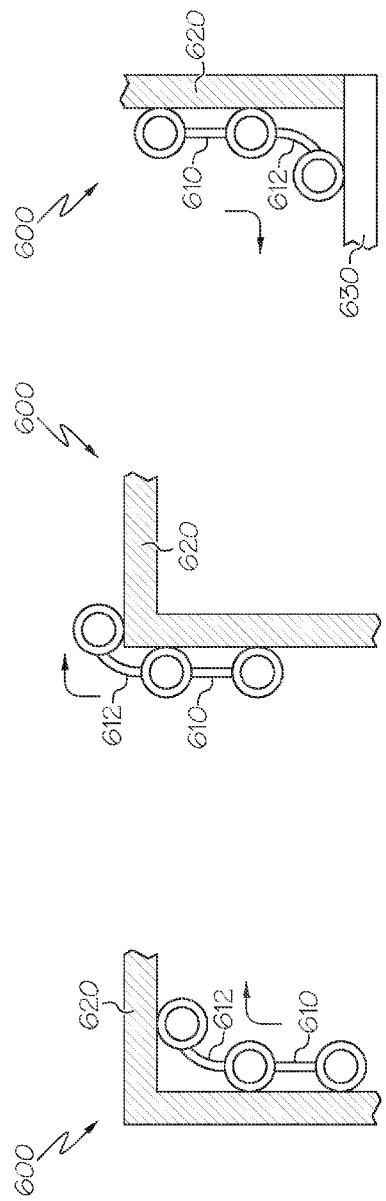
FIG. 14A
FIG. 14B
FIG. 14C

MULTI-SEGMENTED MAGNETIC ROBOT

CROSS-REFERENCE TO RELATED APPLICATIONS

This application claims the benefit of U.S. Provisional Patent Application Ser. No. 62/069,684 filed Oct. 28, 2014, entitled "Multi-Segmented Climbing Robot", the content of which is fully incorporated by reference herein.

BACKGROUND

There exists a need for a robot having the ability to navigate obstacles, climb, and turn over and within areas, such as the hull of a vessel, the interior of a tank, and difficult to reach passageways that feature geometric discontinuities caused by, for example, plumbing, protrusions, and indentations.

BRIEF DESCRIPTION OF THE DRAWINGS

FIG. 9 shows an exploded diagram of the motor assembly of the drive module shown in FIGS. 7 and 8.

FIG. 13 shows a diagram of an embodiment of a two-segment, three-module system in accordance with the Multi-Segmented Magnetic Robot.

FIGS. 14A-14C show diagrams illustrating internal and external corner negotiation of an embodiment of two-segment, three module system in accordance with the Multi-Segmented Magnetic Robot.

DETAILED DESCRIPTION OF SOME EMBODIMENTS

Reference in the specification to "one embodiment" or to "an embodiment" means that a particular element, feature, structure, or characteristic described in connection with the embodiments is included in at least one embodiment. The appearances of the phrases "in one embodiment", "in some embodiments", and "in other embodiments" in various places in the specification are not necessarily all referring to the same embodiment or the same set of embodiments.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

Additionally, use of the "a" or "an" are employed to describe elements and components of the embodiments herein. This is done merely for convenience and to give a general sense of the invention. This detailed description should be read to include one or at least one and the singular also includes the plural unless it is obviously meant otherwise.

The embodiments disclosed herein describe a segmented system with magnetic wheels that can, for example, navigate the hull, tanks, and passageways of a ship. The system provides effective climbing and turning ability over and within a ferrous hull that typically features geometric discontinuities in the form of plumbing, protrusions, and indentations, such as weld seams where hull plating meets.

Figure 1:
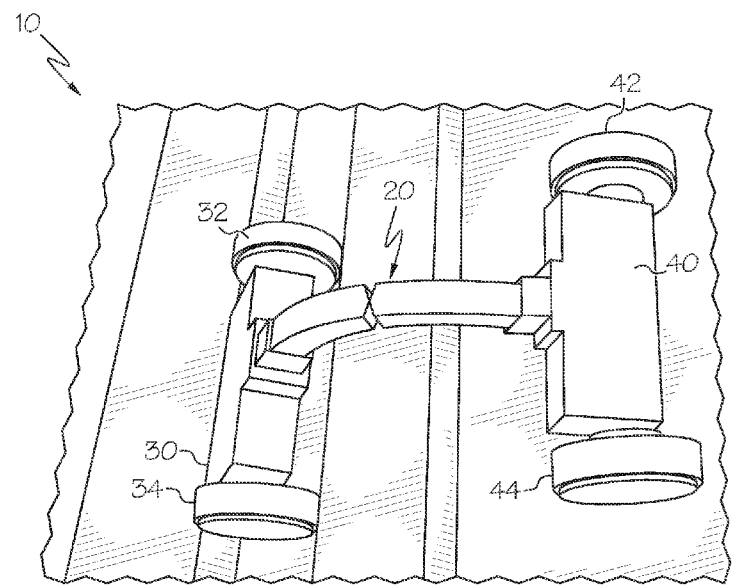
FIG. 1 shows a diagram of an embodiment of a one-segment, two-module system in accordance with the Multi-Segmented Magnetic Robot.
Figure 2:
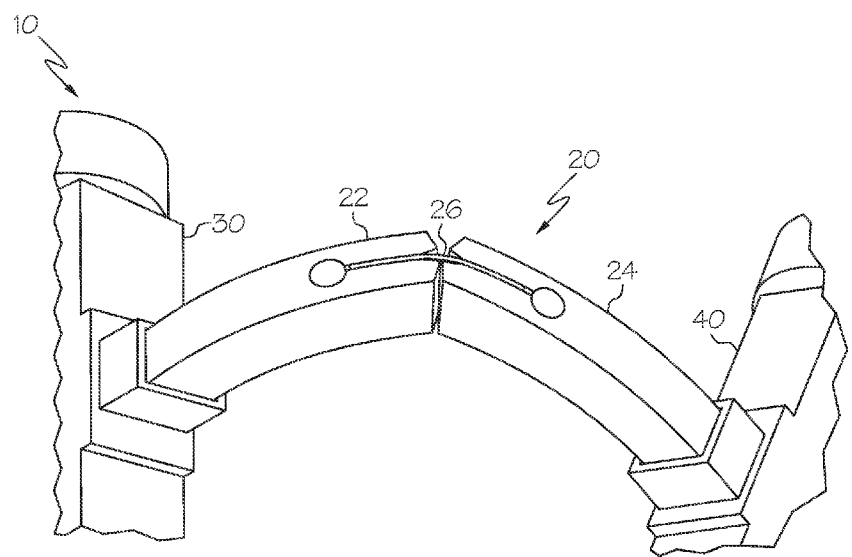
FIG. 2 shows a diagram of the linkage arm of the system shown in FIG. 1.

FIG. 1 shows a diagram of an embodiment of a one-segment system 10 in accordance with the Multi-Segmented Magnetic Robot. System 10 comprises a linkage arm 20 connected on a first end to a first drive module 30 and connected on a second end to a second drive module 40. As an example, linkage arm 20 may be connected to drive modules 30 and 40 using screws and end mounts, as shown in FIG. 2, allowing for quick detachment and reattachment of drive modules. Although system 10 contains one linkage arm 20 and two drive modules 30 and 40, more than one linkage arm and more than two drive modules may be used to create a multi-segmented system, where a segment includes one linkage arm connected to two drive modules. One example of a two-segment system is shown in FIG. 13.

Linkage arm 20 helps transfer push (compressive) and pull (tension) forces between the drive modules 30 and 40 so they work together in concert to overcome obstacles greater than the capability of any one drive module. In some embodiments, linkage arm 20 is arched, while in other embodiments linkage arm 20 is straight (i.e. aligned in height with drive modules 30 and 40). In some embodiments, linkage arm 20 comprises a rigid material, while in other embodiments linkage arm 20 comprises a flexible material, such as rubber, to allow relative motion between drive modules 30 and 40 so that system 10 can turn, negotiate obstacles, and traverse around corners.

A flexible linkage arm 20 allows for all three rotational degrees of freedom (roll, pitch, and yaw), providing excellent mobility at the expense of vehicle control. Accordingly, in such embodiments, a sensor system that provides for accurate relative positioning between drive modules 30 and 40 may be used. One example sensor is a set of stereo cameras on each drive module 30 and 40 that watch the drive module in front of it. The stereo vision output from the sensor can be used to provide accurate pose between drive modules allowing them to coordinate motion for maximum mobility.

Figure 5:
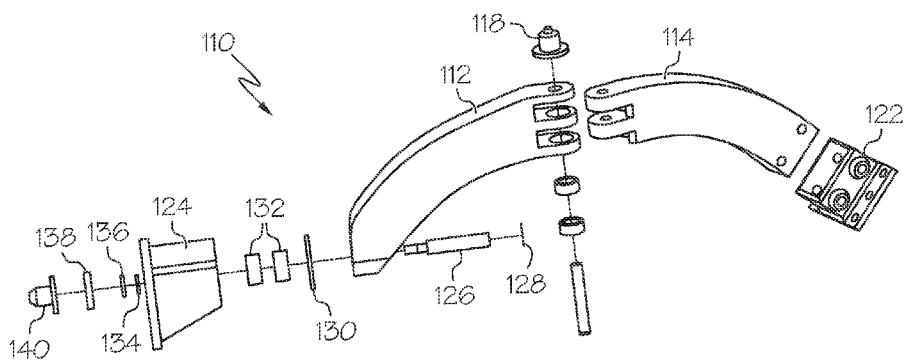
FIG. 5 shows an exploded diagram of the linkage arm of the system shown in FIG. 4.
Figure 12:
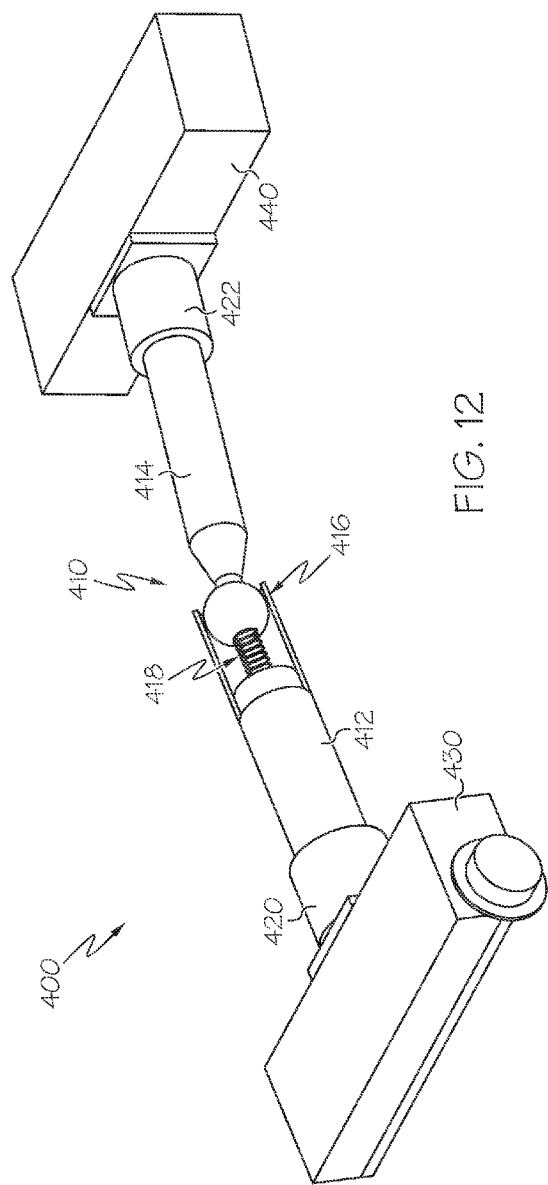
FIG. 12 shows a diagram illustrating a lockable ball-joint linkage that may be used on a system in accordance with the Multi-Segmented Magnetic Robot.

In some embodiments, linkage arm 20 is semi-rigid, meaning that linkage arm 20 is comprised of a rigid material but is configured to have a specific degree of freedom (DOF) such as shown in FIGS. 2, 5, and 12 herein. FIG. 2 shows a close-up of a semi-rigid linkage arm 20. As shown, linkage arm 20 comprises a first linkage arm portion 22 having at least one degree of freedom with respect to a connected second linkage arm portion 24. In some embodiments, and as shown in FIG. 2, at least one degree of freedom is provided by a hinged connection 26 between first linkage arm portion 22 and second linkage arm portion 24. In some embodiments, and as shown in FIG. 2, hinged connection 26 allows for a yaw DOF. In other words, first linkage arm portion 22 and second linkage arm portion 24 are configured to move laterally with respect to the orientation of linkage arm 20 in relation to first drive module 30 and second drive module 40. Thus, the yaw degree of freedom provided by hinged connection 26 allows system 10 to pivot and turn left or right.

As an example, hinged connection 26 may be made as shown in FIG. 5. As another example, hinged connection 26 may be made using a spring hinge, such as a leaf spring. A leaf spring may be used as the pivot to try to bias system 10 towards a position where wheels 32 and 34 and wheels 42 and 44 are aligned, helping to prevent the wheels from getting stuck together if system 10 was over-turned.

In some embodiments, and as discussed in more detail with respect to FIG. 12, at least one degree of freedom is provided by a ball joint connection between first linkage arm portion 22 and second linkage arm portion 24. However, other connections between first linkage arm portion 22 and second linkage arm portion 24 that provide at least one degree of freedom are possible as would be recognized by one having ordinary skill in the art.

Figure 4:
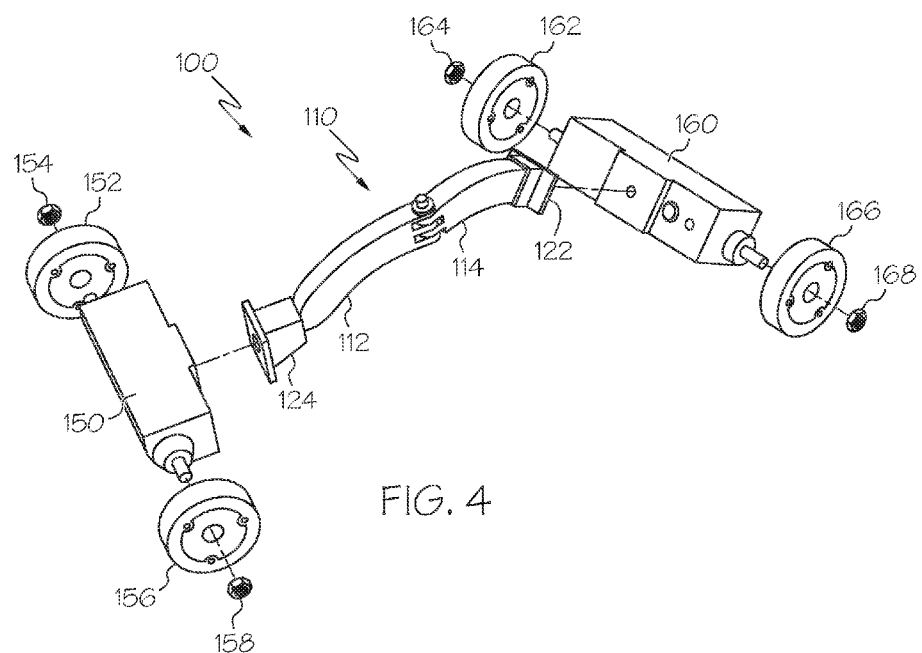
FIG. 4 shows an exploded diagram of an embodiment of a system in accordance with the Multi-Segmented Magnetic Robot.

In some embodiments, and as discussed more in detail with regard to FIGS. 4 and 5, at least one end of linkage arm 20 has at least one DOF with respect to its respectively connected drive module, first drive module 30 and/or first drive module 40. As an example, at least one degree of freedom is obtained by connection of at least one end of linkage arm 20 to its respectively connected drive module 30 and/or 40 using a roll shaft (such as shown by reference 126 in FIG. 5).

In some embodiments, first drive module 30 and second drive module 40 are independently controlled, such as via a remote controller (not shown). In some embodiments, first drive module 30 and second drive module 40 are controlled as a whole system using a control algorithm. In some embodiments, first drive module 30 and second drive module 40 contain accelerometers therein to increase control accuracy. Magnetic wheels 32 and 34 are connected to first drive module 30 and magnetic wheels 42 and 44 are connected to second drive module 40. As an example, magnetic wheels 32, 34, 42, and 44 may be configured similarly to magnetic wheels 300 shown and described with reference to FIGS. 10A-10C and 11.

Figure 3A:
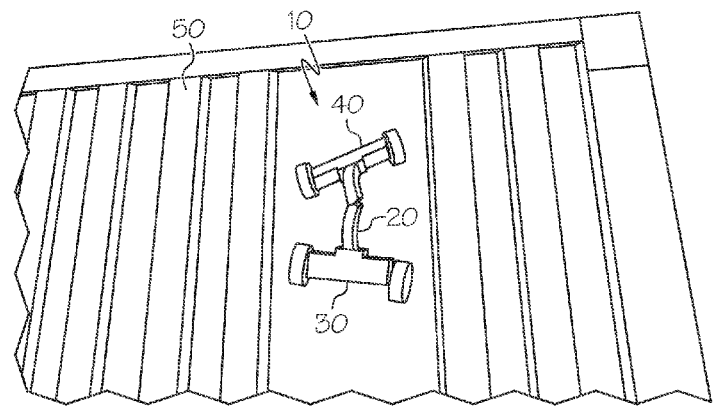
FIGS. 3A-3E show diagrams of the system shown in FIG. 1 climbing up and over the wall of a container.
Figure 3B:
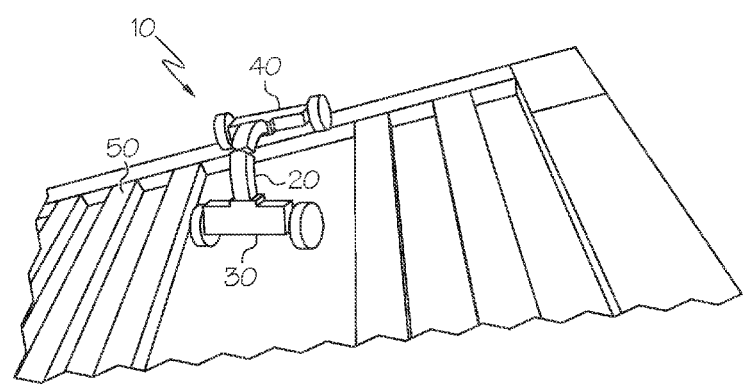
Figure 3C:
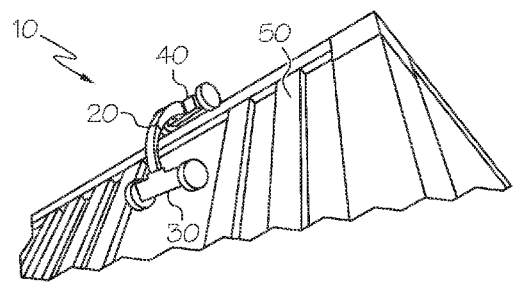

FIGS. 3A-3E show diagrams of system 10 climbing up and over a side wall of a container 50. FIG. 3A shows system 10 climbing up near the top of the container at a slight angle with respect to vertical. FIG. 3B shows second drive module 40 reaching the top of container 50, with FIG. 3C showing a first wheel of second drive module 40 contacting the top surface of container 50. The degree(s) of freedom between second drive module 40 and linkage arm 20, as is discussed in more detail below, allows both wheels of second drive module 40 as well as both wheels of first drive module 30, to contact the surface of container 50 at all times while climbing over the top edge of container 50.

Figure 3D:
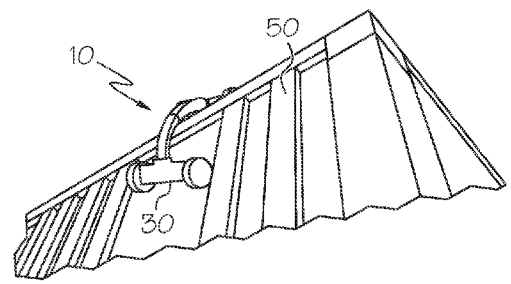
Figure 3E:
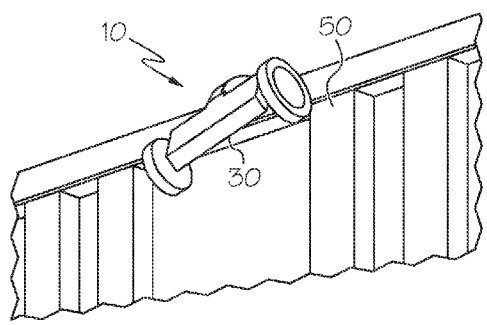

FIG. 3D shows second drive module 40 climbing over the top edge of container 50. A curved linkage arm 20 allows for first drive module 30 to still contact the side wall while second drive module 40 contacts the top surface of container 50. FIG. 3E shows the orientation of first drive module 30 as system 10 completes its climb on top of container 50.

FIG. 4 shows an exploded diagram of an embodiment of a system 100 in accordance with the Multi-Segmented Magnetic Robot. System 100 comprises a linkage arm 110 connected on a first end to a first drive module 150 and connected on a second end to a second drive module 160. First drive module 150 and second drive module 160 may be independently controlled, such as via a remote controller, or controlled as a whole system using a control algorithm. Magnetic wheels 152 and 156 are connected to first drive module 150 via respective retaining nuts 154 and 158, while magnetic wheels 162 and 166 are connected to second drive module 160 via respective retaining nuts 164 and 168. As an example, magnetic wheels 152, 156, 162, and 166 may be configured similarly to magnetic wheels 300 shown and described with reference to FIGS. 10A-10C and 11.

Linkage arm 110 comprises a first linkage arm portion 112 having at least one degree of freedom with respect to a connected second linkage arm portion 114. As an example, and as shown in FIG. 5, linkage arm portion 112 is connected to first drive module using a roll shaft 126 connected to an encoder chassis mount 124. Further, linkage arm portion 114 may be connected to second drive module 160 via an end mount connection 122.

First linkage arm portion 112 and second linkage arm portion 114 are connected via a hinged connection that allows for lateral movement with respect to the direction of orientation of linkage arm 110 with respect to first drive module 150 and second drive module 160. FIG. 5 shows an exploded diagram of linkage arm 110. As shown in FIG. 5, sealed bearings 120 are press-fit into the end of linkage arm portion 112, and after connection is made with the respective end of second linkage arm portion 114, yaw shaft 116 is press-fit into the openings to join linkage arm portion 112 and linkage arm portion 114 and provide for a connection that is configured to withstand significant wear and tear and allows for smooth DOF movement. A yaw encoder 118 is attached at the hinged connection to report yaw motion.

For the connection of the other end of first linkage arm portion 112 to first drive module 150, roll shaft 126 is passed through an opening in the end of linkage arm portion 112 and secured by retaining ring 128. A washer 130 is placed over the distal end of roll shaft 126, with the distal end of roll shaft 126 passed through sealed bearings 132, which are press-fit into encoder chassis mount 124, followed by washer 134, shaft retaining clip 136, encoder mounting plate 138, and roll encoder 140, with washer 134, clip 136, plate 138, and encoder 140 all fitting within mount 124 to ensure surface-to-surface contact between mount 124 and first drive module 150 and to allow smooth roll DOF movement.

Figure 6A:
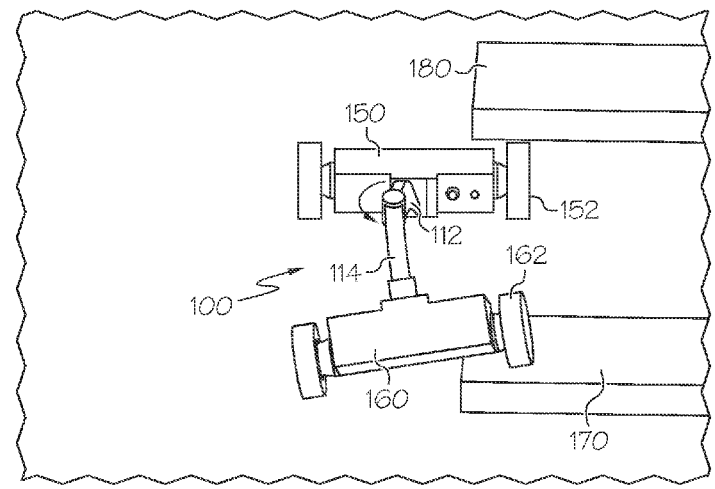
FIG. 6A shows a diagram of the system shown in FIG. 4 navigating over an obstacle.
Figure 6B:
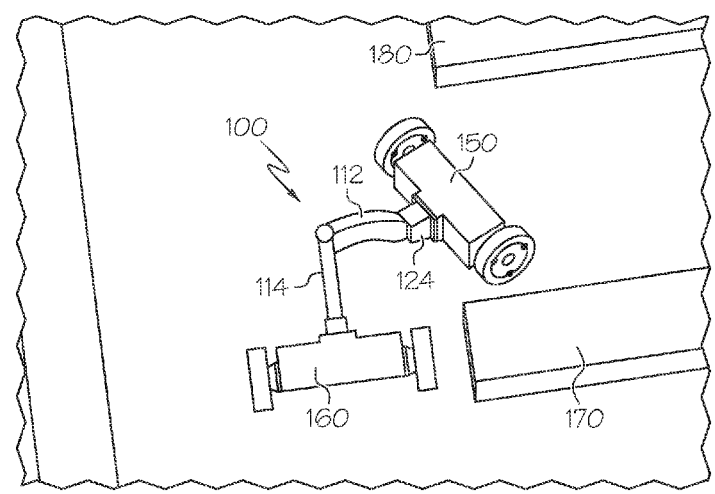
FIG. 6B shows a diagram of the system shown in FIG. 4 navigating between obstacles.

Referring to FIGS. 6A and 6B, FIG. 6A shows a diagram of system 100 navigating over an obstacle 170, while FIG. 6B shows a diagram of system 100 navigating between obstacles 170 and 180. As an example, obstacles 170 and 180 may be ground-based, may be vertically oriented such as on a wall, or may be ceiling-based provided the ceiling comprises a magnetizable surface. The design of system 100 allows for multiple DOFs to allow for roll and yaw motion, as shown in FIGS. 6A and 6B.

The DOFs are desirable for the platform to navigate real-world structures. The multiple DOFs allow the maximum wheel contact to the surface regardless of obstacles and surface curvature. In some embodiments, each DOF is outfitted with an encoder to provide pitch, roll, and/or yaw information. The coordinating controller uses the data as inputs to the PID controller (see FIG. 16) and the physics-based adaptive controller (see FIG. 18) to provide coordinated motion among all drive modules. This approach relieves the burden on the operator from having to control each drive module individually.

As shown by the arrow in FIG. 6A, linkage arm 110, particularly linkage arm portion 112, is configured to roll in the counter-clockwise direction as magnetic wheel 162 rolls over obstacle 170, allowing magnetic wheel 152 to remain in contact with the surface. This configuration may be particularly important in scenarios where system 100 is navigating the ceiling or walls of a structure. FIG. 6B demonstrates the yaw DOF that enables system 100 to turn and navigate between obstacles using the hinged connection between first linkage arm portion 112 and second linkage arm portion 114 and the independent or coordinated control of first drive module 150 and second drive module 160.

Figure 7:
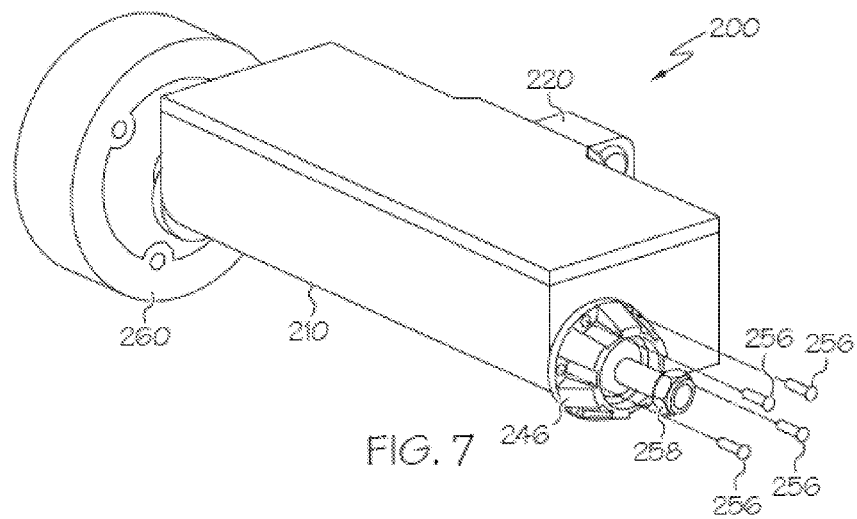
FIG. 7 shows a diagram of an embodiment of a drive module that may be used on a system in accordance with the Multi-Segmented Magnetic Robot.
Figure 8:
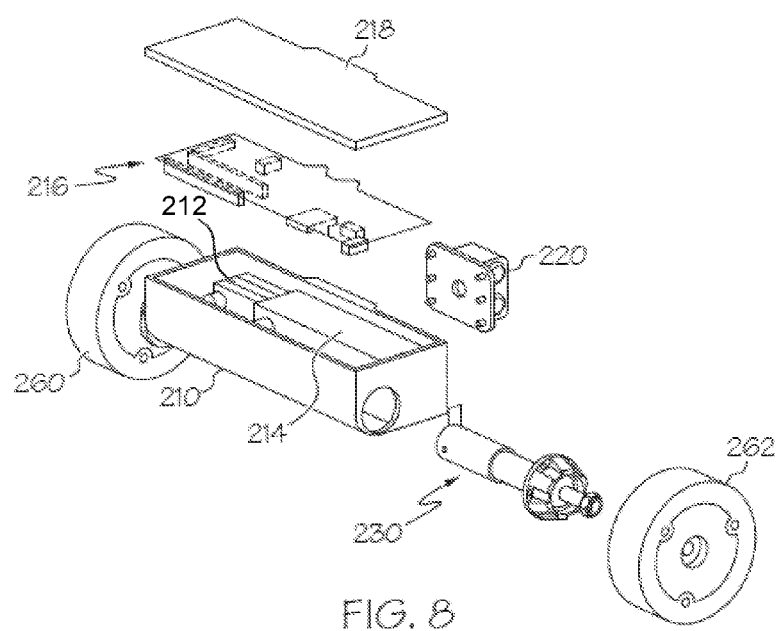
FIG. 8 shows an exploded diagram of the drive module shown in FIG. 7.
Figures 10A, 10B, 10C:
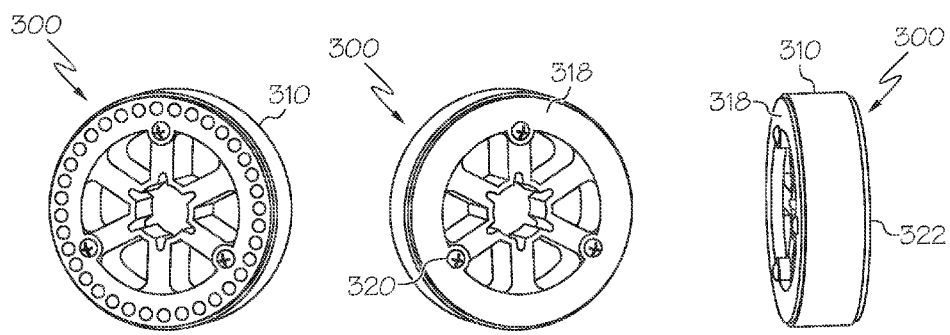
FIGS. 10A-10C show perspective views of an embodiment of a wheel assembly that may be used on a system in accordance with the Multi-Segmented Magnetic Robot.

Referring to FIGS. 7 and 8, FIG. 7 shows a perspective view and FIG. 8 shows an exploded diagram of an embodiment of a drive module 200 that may be used on a system in accordance with the Multi-Segmented Magnetic Robot. As an example, drive module 200 may be used for any of drive modules 30 and 40 of system 10 and/or drive modules 150 and 160 of system 100. Module 200 includes a housing 210 containing motor controllers 212, a battery 214, and electronics 216, and having a lid 218. Housing 210 protects its contents from water, dust, dirt, and impacts with obstacles. A linkage adapter 220 is coupled thereto to allow for connection of a linkage arm, such as linkage arm 20 of system 10 and/or linkage arm 110 of system 100. In some embodiments, housing 210 includes a slot for an antenna (not shown) and an on/off switch (not shown) to control the power of drive module 200.

A motor assembly 230 is configured to be housed within each end of drive module 200 to connect magnetic wheels 260 and 262 to drive module 200. Motor assembly 230 provides the torque to rotate the magnetic wheels and move the system. The primary design considerations for the motor assembly include torque output, speed output, shock absorption, weight, robustness, and modularity. Required motor torque may be calculated by multiplying the weight of a drive module segment by the magnetic wheel radius and safety factor of two. As an example, the required torque for a single motor output is 20 inch-pounds. A required speed output of 57 rpm is determined by multiplying the desired climbing speed of the system by the wheel circumference. These values may be used to select an optimal motor and gearbox combination for particular system requirements.

FIG. 9 shows an exploded diagram of motor assembly 230. Motor assembly 230 includes a motor and gear head housing 232 containing a motor 234, gear box 236, and encoder 238. Portion 232 is rigidly connected to hub housing 246. A motor-to-wheel coupler 240 connects portion 232 to wheel shaft 242, which has a shaft retaining ring slot 244. Hub housing 246, having a hub retaining ring groove 248, fits over wheel shaft 242 and is secured using screws 256 as shown in FIG. 7. Ball bearings 250 support wheel shaft 242 to hub housing 246 and are sealed against dust, water, and other contaminants. Shaft 242 is secured using a shaft retaining ring 252, which locks onto wheel shaft 242 at shaft retaining ring slot 244. Hub retaining ring 254 locks into hub retaining ring groove 248 to prevent bearings 250 from sliding out of hub housing 246. A magnetic wheel, such as wheel 260 and 262, is secured to wheel shaft 242 using retaining nut 258 as shown in FIG. 7.

Most unmanned ground vehicles are submitted to large shock loads as the system traverses over rough ground. Systems that climb or are thrown tend to experience even larger shock loads in the inevitable case where they fall and hit the ground. Gearbox output shafts are often hardened and will easily break if a large radial load is experienced. As such, the design of drive module 200 mitigates the effects of large shock loads where the system falls onto the wheels. Wheel shaft 242 is supported by two high-load bearings 250 directly coupled to the housing 232.

If the system falls and impacts a wheel, the radial loads are distributed through wheel shaft 242 to housing 232 and back to housing 210 instead of to wheel shaft 242. Motor-to-wheel coupler 240 allows relative motion between wheel shaft 242 and the gearbox shaft during impacts that cause wheel shaft 242 to deflect, while allowing torque to be transmitted from shaft to shaft for vehicle motion.

Figure 11:
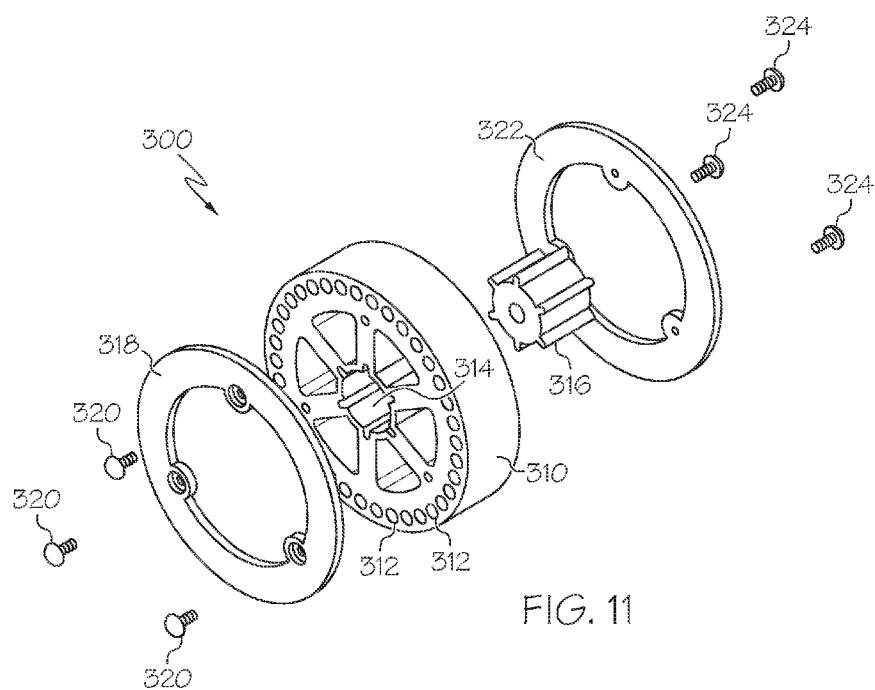
FIG. 11 shows an exploded diagram of the wheel assembly shown in FIGS. 10A-10C.

Referring now to FIGS. 10A-10C and 11, FIGS. 10A-10C show perspective views and FIG. 11 shows an exploded view of an embodiment of a wheel assembly 300 that may be used on a system in accordance with the Multi-Segmented Magnetic Robot. As an example, wheel assembly 300 may be used for any of the magnetic wheels contained on the embodiments of the systems disclosed herein, including systems 10 and 100.

Magnetic wheel assembly 300 provides the attractive force between the system and the surface traversed, allowing the system to traverse vertical and inverted ferrous surfaces. The outer surface of wheel assembly 300 has a high coefficient of static friction. Such a feature makes the attached system useful for exploration of ships, shipping containers, and other ferrous environments.

Wheel assembly 300 includes a wheel housing 310. Wheel housing 310 allows the entire wheel assembly 300 to flex during impacts with the ground. As an example, wheel housing may be made of rubber, such as neoprene, or other durable material that provides desired traction on a surface, or comprise a combination of materials having different characteristics. Wheel housing 310 includes a plurality of slots 312 disposed around the perimeter where magnets, such as N52 neodymium magnets, are inserted to provide for magnetic capability. In some embodiments, the magnets are inserted into the slots such that all like-poles are facing the same direction. This configuration offers the optimal magnetic flux at the contact points of wheel assembly 300 to the surface. The slots are oriented such that the array of magnets is oriented parallel to the central axis of wheel assembly 300.

A wheel core 316 is press-fit into wheel housing 310 for attachment to wheel shaft 242 shown in FIG. 9. Wheel core 316 translates torque from the wheel shaft of the drive module to wheel assembly 300 to facilitate motion of the attached system. A first flux plate 318 is secured to one side of wheel housing 310 via screws 320 and a second flux plate 322 is secured to the other side of wheel housing 310 via screws 324. Flux plates 318 and 322 concentrate the magnets to form a cohesive magnetic field. In embodiments where a rubber wheel housing 310 is used, flux plates 318 and 322 may be slightly smaller in diameter than wheel housing 310, allowing wheel to fully make contact with the surface for greater traction. In some embodiments, flux-plate locators (not shown) help keep the flux-plates centered on wheel housing 310.

Optimization of wheel assembly 300 using flux-plate wheel design is discussed in depth in a paper entitled "Design and Optimization of a Magnetic Wheel for Hull Climbing" by Kerber et al., the entire content of which is incorporated by reference herein. As an example, one embodiment of a wheel assembly 300 may be 1.25 inches wide, 4 inches in diameter, and have a measured attraction force of 21 lbf.

FIG. 12 shows a diagram illustrating a lockable ball-joint linkage 400 that may be used on a system in accordance with the Multi-Segmented Magnetic Robot. As an example, ball-joint linkage 400 may be used on systems 10 and 100 disclosed herein. The lockable ball-joint linkage allows for locking the pitch-and-yaw DOFs when compressed. As shown, a linkage arm 410 includes a first linkage arm portion 412 connected using an end mount 420 to a first drive module 430 and a second linkage arm portion 414 connected using an end mount 422 to a second drive module 440. A ball coupled to the distal end of second linkage arm portion 414 is inserted into the distal end of first linkage arm portion 412 and held into normal operating position using a spring 418.

The idea behind the ball-joint linkage is that for compressive force to be translated from one robot module to the next the ball-joint must be locked in the pitch DOF or the linkage will simply start to fold on itself. The ball-joint design allows the magnetic wheels to maintain surface contact with pitch, roll, and yaw DOFs. The design also allows tension (pull) forces through the ball joint. Inside the ball joint, spring 418 pushes ball 416 into the normal operating position, but when a compressive force between drive modules 430 and 440 starts to compress spring 418, ball 416 slides further into its receptacle and the pitch-and-yaw DOFs are constrained. As the compressive force diminishes, spring 418 returns to its original position and the joint regains its full range of motion.

FIG. 13 shows a diagram of an embodiment of a two-segment system 500 in accordance with the Multi-Segmented Magnetic Robot. System 500 includes a first linkage arm 510 connected on one end to a first drive module 520, having magnetic wheels 522 and 524 secured thereto, and on another end to a second drive module 530, having magnetic wheels 532 and 534 secured thereto. System 500 further includes a second linkage arm 540 connected at one end to second drive module 530 and at the other end to a third drive module 550, having magnetic wheels 552 and 554 secured thereto. In some embodiments, drive modules 520, 530, and 550 are controlled independently of each other, while in other embodiments they are controlled by a coordinated controller.

As shown, linkage arms 510 and 540 are arched. However, linkage arms 510 and 540 may comprise other orientations as would be recognized by one having ordinary skill in the art. Further, linkage arms 510 and 540, while shown as rigid, may be configured to have a hinged connection or other connection allowing for a degree of freedom between its respectively attached drive modules, such as shown in FIGS. 2, 5, and 12.

In some embodiments, first linkage arm 510 has at least one DOF with respect to first drive module 520. In some embodiments, second linkage arm 540 has at least one degree of freedom with respect to third drive module 550. As an example, the degree of freedom may be provided by securing the respective linkage arm to the respective drive module using a roll shaft as shown in FIG. 5.

FIGS. 14A-14C show diagrams 600 illustrating internal and external corner negotiation of an embodiment of a two-segment, three module system 610 in accordance with the Multi-Segmented Magnetic Robot. In the situations encountered by system 610 linkage flexibility and force transmission are important. Drive modules with too many DoFs may make control of the system overly complex and limit how force can be transmitted between drive modules. However, a linkage with insufficient DoFs will limit the maneuverability and obstacle traversing ability of the system.

System 610 contains two linkage arms, one of which, linkage arm 612 is flexible. The flexible linkage arm improves the ability of system 600 to negotiate corners of structures, such as structure 620. FIG. 14A shows a diagram illustrating system 610 transitioning from an interior wall to the ceiling of structure 620. FIG. 14B shows a diagram illustrating system 610 transitioning from an exterior wall to the ceiling of structure 620. FIG. 14C shows a diagram illustrating system 610 transitioning from an interior or exterior wall of structure 620 to a ground surface 630.

Figure 15A:
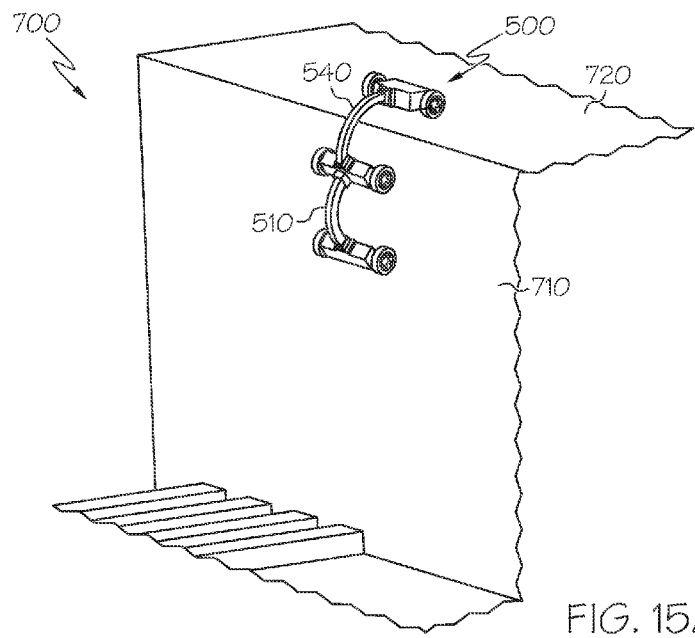
FIG. 15A shows a diagram illustrating the system shown in FIG. 13 navigating the exterior corner of a structure.
Figure 15B:
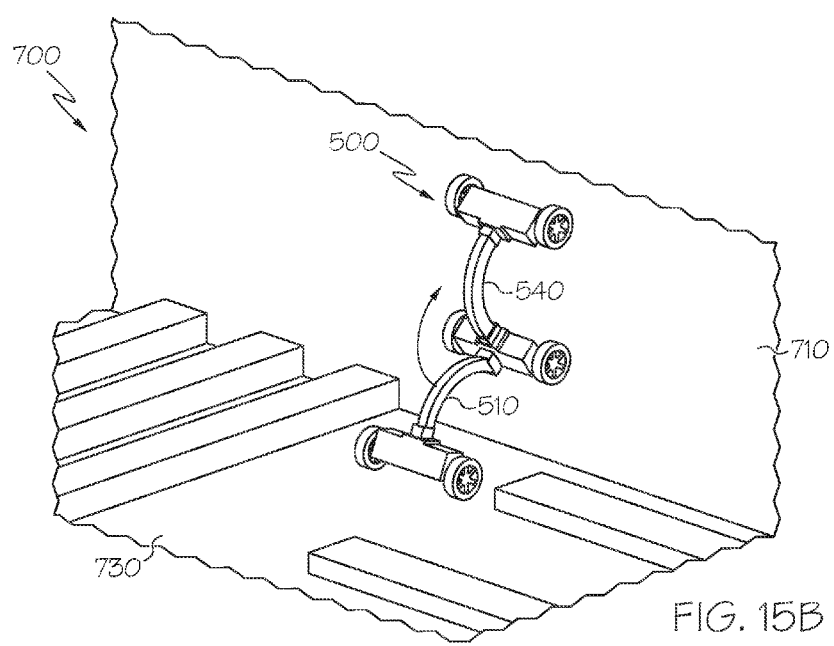
FIG. 15B shows a diagram illustrating the system shown in FIG. 13 transitioning from a vertical wall of a structure to a ground surface.

The climbing operation of a two-segment system, such as system 500, is shown in FIGS. 15A and 15B. FIG. 15A shows a diagram 700 illustrating system 500 climbing down a wall 710 of a structure from the top surface 720 of the structure, while FIG. 15B shows a diagram 700 illustrating system 500 transitioning down from wall 710 to a ground surface 730. It should be recognized however, that system 500 could also readily transition from ground surface 730 to wall 710 and scale such a structure. As illustrated in FIG. 15A, the use of independent drive modules enables push-pull capability to increase the ability to navigate over obstacles, such as exterior corners of structures.

FIG. 15B demonstrates the pitch DOF in the linkage. Existing magnetic wall climbing robots find this transition difficult, as magnetic force prevents the robot from releasing the ferrous wall. Consequently, the robot is either stuck to the wall, or the operator must find a means to detach the robot from the wall. For example, the operator might attempt to speed around an external corner at an angle in the hope that the wheels will lose grip of the wall at the sharp corner. The design of system 500 utilizes the independent drive modules to make the transition from wall to ground. The rear drive modules push the forward module away from wall 710 and the forward module in turn pulls subsequent modules away from wall 710. As shown by the arrow in FIG. 15B, as system 500 reaches the ground surface, linkage arm 510 folds upward towards linkage arm 540 to allow for all of the magnetic wheels to contact a surface, either wall 710 or ground 730, at all times.

Software for the embodiments of the systems disclosed herein can be divided into driver module, operator control, and coordinated control. Driver module software runs on integrated circuits within the driver module and is responsible for low-level functionality of the system such as motor control and battery-level monitoring. The coordinated control software (CCS) receives feedback from the motor encoders and relative positioning sensors and provides the commands to the motor controllers for optimal motion along the system's path.

The CCS coordinates the motion of the drive modules to allow the system to climb, turn, and scale obstacles more effectively. Using the CCS, each wheel on the system is actuated individually, providing its own output speed. Although control of a four-wheel drive system using a standard radio controller (RC) is possible, such as system benefits from use of a coordinated controller. In some embodiments, a leader-follower control scheme may be used, where the operator directs the front drive module to go forward, left, or right. The rest of the drive modules will then follow the drive module in front of them using a simple proportional, integral, and derivative (PID) controller, such as that shown in the block diagram 800 in FIG. 16. In the case where the operator commands the system to go backward, the rear robot module will take the lead and the rest will follow using the same scheme.

Figure 16:
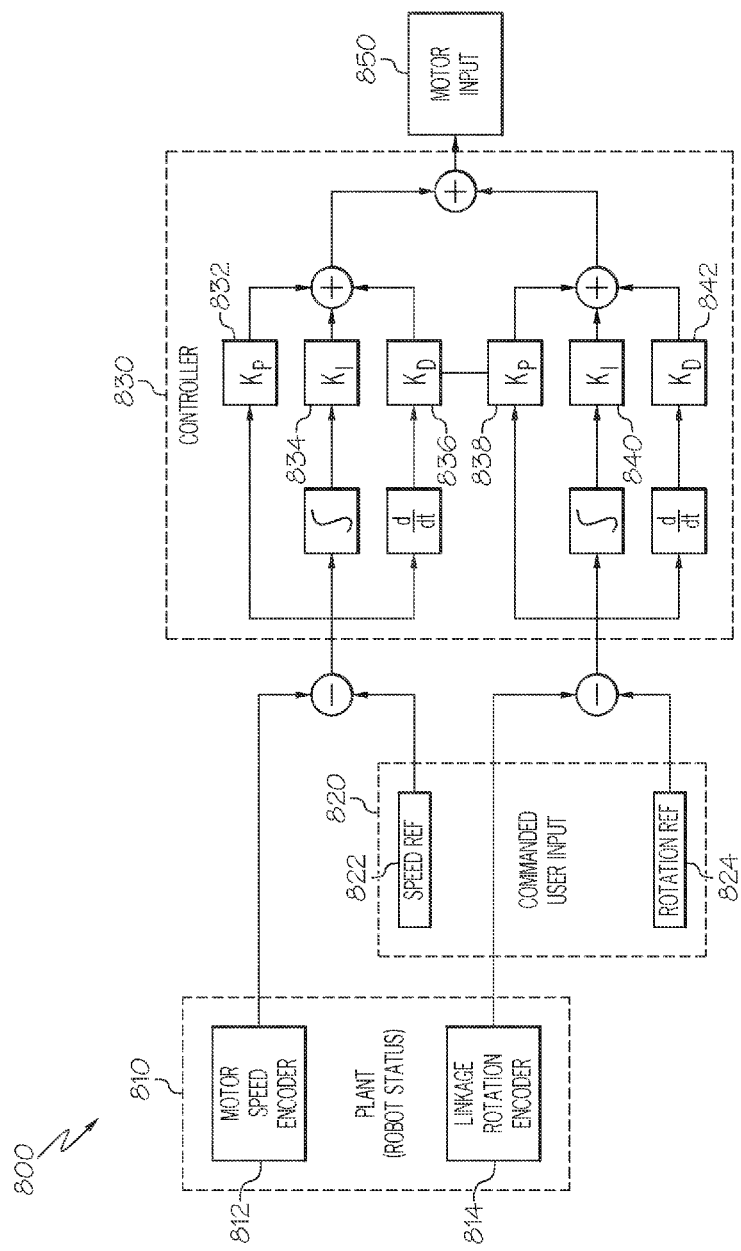
FIG. 16 shows a block diagram illustrating a module controller that may be used on a system in accordance with the Multi-Segmented Magnetic Robot.

As shown in diagram 800 of FIG. 16, system status 810 and commanded user input 820 is provided to controller 830, which generates motor input 850. Inputs for the leader-follower control scheme may include motor speed and relative (yaw) angle of the drive modules next to each other, as well as roll and pitch. The motor speed can be obtained from the encoders already integral to the drive modules. Encoders at the linkage DOFs provide the relative angles between drive modules. Roll and pitch angles are not required for accurate control in non-complex driving situations such as flat surfaces, but may be required for navigating more complex obstacles. A sensor may be added to the linkage to collect the relative yaw angle between drive modules. This approach operates under the determination that the roll and pitch variations between drive modules is not enough to significantly influence the control output. Accordingly, system status 810 includes data from motor speed encoder 812, such as encoder 238 shown in FIG. 9, and linkage rotation encoder 814, such as roll encoder 140 shown in FIG. 5.

Commanded user input 820 may include speed reference data 822 and rotation reference data 824. The difference between the motor speed encoder data 812 and the speed reference data 822 is provided to controller 830 and is multiplied by value $K_P$ 832, the integral of the difference value is taken and is multiplied by value $K_I$ 834, and the derivative of the difference value is taken and is multiplied by value $K_D$, 836. Values 832, 834, and 836 are then summed.

Similarly, the difference between linkage rotation encoder data 814 and rotation reference data 824 is provided to controller 830 and is multiplied by value $K_p$ 838. The integral of the difference value is taken and is multiplied by value $K_I$ 840, and the derivative of the difference value is taken and is multiplied by value $K_D$, 842. Values 838, 840, and 842 are then summed. Both of the resulting summed values are then summed. The resultant value is then provided by controller 830 as motor input 850, which is used by the motor assembly, such as motor assembly 230 shown in FIG. 8.

Figure 18:
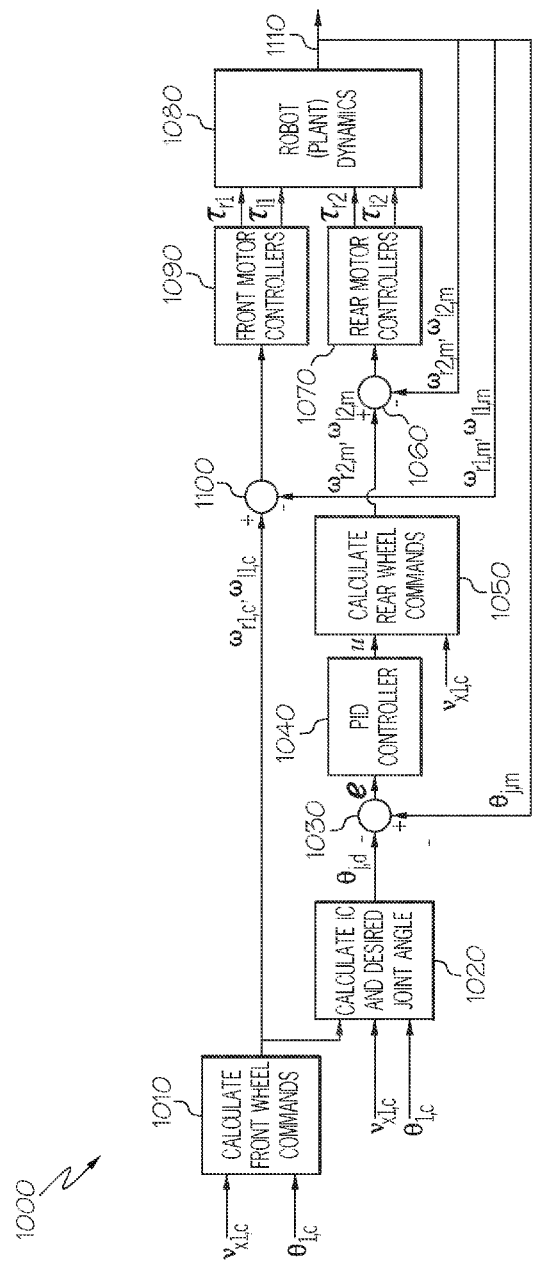
FIG. 18 shows a block diagram of an embodiment of a leader-follower controller that may be used on a system in accordance with the Multi-Segmented Magnetic Robot.

If the leader-follower controller is inadequate because of the pitch and roll DOFs, or if the linkage design is overly complex to support the leader-follower approach (e.g. design contains a plurality of segments), a more complex control architecture may be used. In such embodiments, the controller as shown in FIG. 16 or FIG. 18, developed for the leader-follower scheme, may be reused within a physics-model-based controller.

Figure 17:
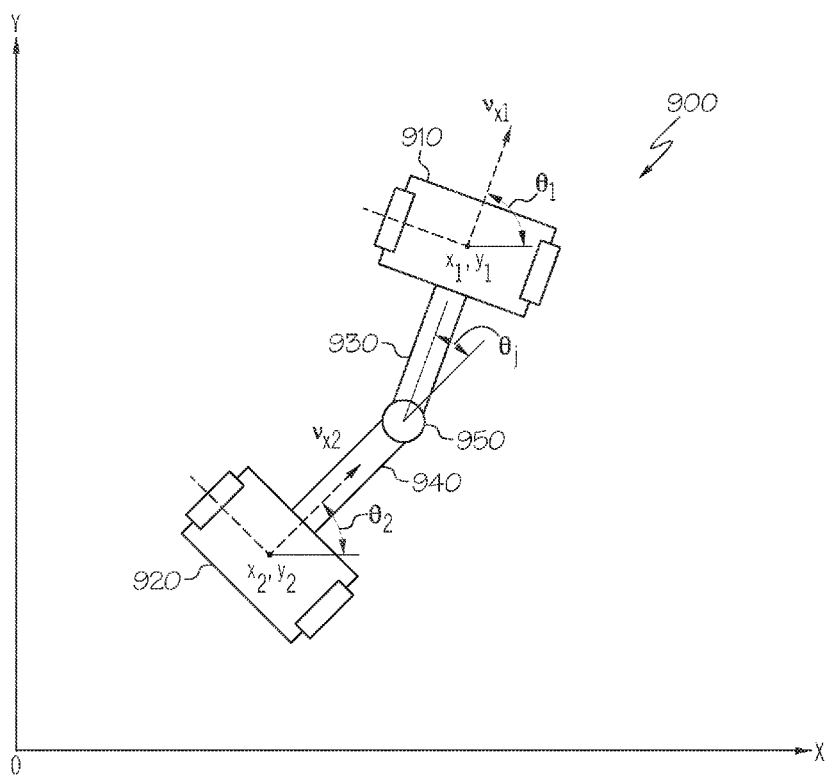
FIG. 17 shows a diagram representing the motion of a system in accordance with the Multi-Segmented Magnetic Robot.

FIG. 17 shows a diagram 900 representing the motion of a system in accordance with the Multi-Segmented Magnetic Robot. As shown, the system includes a first drive module 910 connected to a second drive module 920 by a linkage arm comprising a first linkage arm portion 930 connected to a second linkage arm portion 940 via a connection 950 that allows for lateral movement with respect to the direction of orientation of the linkage arm with respect to the drive modules, as is discussed herein. For a leader-follower controller, such as that shown in FIG. 18, the robot's geometry, kinematic constraints and the user-commanded velocities are used to calculate the desired instantaneous center of rotation the robot is to follow, and the corresponding central linkage angle necessary for the back module to follow the front module when turning. The commands to the rear driving motors are determined by applying proportional-integral-derivative (PID) control on the error between the desired and measured linkage angle position.

In terms of kinematics, consider the robot motion on a planar magnetic surface, shown in FIG. 17. Here, rotation about the roll axis is ignored and only rotation of the yaw axis is considered. Assume that the magnetic adhesion force is sufficient to keep the robot in contact with the metal surface, and that the robot does not slip. The robot position in an inertial frame aligned with the magnetic surface is fully described by the vector q:

$$q = [x_1 y_1 \theta_1 \theta_2]^T \qquad \text{(Eq. 1)}$$

where $x_1$ and $y_1$ are the coordinates of the front module center of mass, assumed located in the front drive module's geometric center, and $\theta_1$ and $\theta_2$ are the orientations of the front and rear modules, respectively. The position of the rear module, $(x_2, y_2)$, is related to the position of the front module by $$x_2 = x_1 + d_1 \cos \theta_1 + d_2 \cos \theta_2$$

$$y_2 = y_1 + d_1 \sin \theta_1 + d_2 \sin \theta_2 \qquad \text{(Eq. 2)}$$

where $d_1$ and $d_2$ are the distances from the front and rear module centers of mass to the yaw joint, respectively. Differentiating Eq. 2 yields the linear velocities, $(\dot{x}_2, \dot{y}_2)$, of the second module:

$$\dot{x}_2 = \dot{x}_1 - \dot{\theta}_1 d_1 \sin \theta_1 - \dot{\theta}_2 d_2 \sin \theta_2$$

$$\dot{y}_2 = \dot{y}_1 + \dot{\theta}_1 d_1 \cos \theta_1 + \dot{\theta}_2 d_2 \cos \theta_2 \qquad \text{(Eq. 3)}$$

where $\dot{x}_1$ and $\dot{y}_1$ are the linear velocities of the front module, and $\dot{\theta}_1$ and $\dot{\theta}_2$ are the rotational velocities of the first and second modules, respectively. Differentiating Eq. 2 again yields the linear accelerations, $(\ddot{x}_2, \ddot{y}_2)$, of the second module:

$$\ddot{x}_2 = \ddot{x}_1 - \ddot{\theta}_1 d_1 \sin \theta_1 - \dot{\theta}_1^2 d_1 \cos \theta_1 - \ddot{\theta}_2 d_2 \sin \theta_2 - \dot{\theta}_2^2 d_2 \cos \theta_2$$

$$\ddot{y}_2 = \ddot{\theta}_1 d_1 \cos \theta_1 - \dot{\theta}_1^2 d_1 \sin \theta_1 + \ddot{\theta}_2 d_2 \cos \theta_2 - \dot{\theta}_2^2 d_2 \sin \theta_2 \qquad \text{(Eq. 4)}$$

where $\ddot{x}_1$ and $\ddot{y}_1$ are the linear accelerations of the front module, and $\ddot{\theta}_1$ and $\ddot{\theta}_2$ are the rotational accelerations of the first and second modules, respectively. The inertial linear velocities of a drive module are related to its forward velocity $v_{xi}$ in a body-centric frame:

$$\dot{x}_i = v_{xi} \cos \theta_1$$

$$\dot{y}_i = v_{xi} \sin \theta_1 \quad \text{(Eq. 5)}$$

where i=1, 2, where 1 refers to the front module and 2 refers to the rear module. The body-centric forward velocity of module i is related to its left and right wheel rotational velocities:

$$v_{xi} = \frac{r_w(\omega_{ri} + \omega_{li})}{2} \quad \text{(Eq. 6)}$$

where $r_w$ is the wheel radius, $\omega_{ri}$ is the right wheel rotational velocity and $\omega_{li}$ is the left wheel rotational velocity. The rotational velocity of a drive module is also related to its wheel velocities:

$$\dot{\theta}_1 = \frac{r_w(\omega_{ri} + \omega_{li})}{w} \quad \text{(Eq. 7)}$$

where w is the distance between the right and left wheels of the drive module.

If the front and rear modules are to follow the same circular path on the plane, there will be a yaw joint angle $\theta_{j,d}$ that will permit the rear module to follow the front module. Consider the moment the front module enters a curve, while the rear module maintains its previous heading. The instantaneous center of rotation of the front module, $r_{IC}$, is:

$$r_{IC} = \frac{w(\omega_{r1} + \omega_{l1})}{2(\omega_{r1} - \omega_{l1})} \quad \text{(Eq. 8)}$$

The path length s that must be traveled by the rear module before it enters the same curve is $$s = r_{IC} \theta_d = d_1 + d_2 \quad \text{(Eq. 9)}$$

At the moment the rear module enters the curve, the angle $\theta_d$ is the difference in orientation between the front and rear modules. This angle can be calculated from the instantaneous center of rotation by rewriting Equation (9):

$$\theta_d = \frac{d_1 + d_2}{r_{IC}} = \frac{2(d_1 + d_2)(\omega_{r1} - \omega_{l1})}{w(\omega_{r1} + \omega_{l1})} \quad \text{(Eq. 10)}$$

Note that if the robot is traveling on a straight path, $r_{IC}$ is infinite and the desired joint angle is 0.

A simple leader-follower controller is desired so that the rear module follows the same path as the front module. The user directly drives the front module using a joystick, which sends forward and turning velocity commands that are converted into left and right motor speeds. The leader-follower controller must determine the commands to send to the right and left rear motors. For straight-line motion, one could simply match all the motor speeds, but this will not work while turning. There is a path-dependent yaw joint angle that permits the rear module to follow the front module regardless of the path curvature. Using the kinematic equations above, a feedback controller that drives the yaw joint angle to the desired angle can be implemented.

FIG. 18 shows a block diagram of an embodiment of a leader-follower controller 1000 that may be used on a system in accordance with the Multi-Segmented Magnetic Robot. The user sends linear and angular velocity commands to the front module which are translated into left and right motor speed commands at block 1010. These motor speed commands are also used to calculate the desired yaw joint angle using Eq. 10 at block 1020. Sensor feedback is used at block 1030 to calculate the error between the desired and measured joint angle. PID control on this error and an additional kinematic constraint are applied at block 1040 to determine the right and left rear motor speed commands at block 1050, as explained below. Note that each motor also has its own individual controller (blocks 1090 and 1070 for the front and rear modules, respectively).

The robot is equipped with wheel encoders, an IMU on each module, and an angular position sensor on its yaw joint. The errors between the commanded and measured left and right wheel speeds of the front module are computed at block 1100. Errors between the commanded and measured left and right wheel speeds of the rear module are computed at block 1060. These errors are used by the front and rear module controllers, blocks 1090 and 1070, respectively, to send commands to the front and rear module motors (not shown). The torques applied by the robot motors cause robot motion at block 1080. The robot wheel speeds, accelerations and yaw joint angle are measured by the wheel encoders, IMUs and yaw joint encoder, respectively, at block 1110.

The error between the desired and measured joint angle is calculated as:

$$e = \theta_{j,m} - \theta_d \quad \text{(Eq. 11)}$$

where $\theta_{j,m}$ is the measured joint angle. The change in this error can be calculated using the encoder measurements from both sets of wheels:

$$\dot{e} = \dot{\theta}_1 - \dot{\theta}_2 = \frac{r_w(\omega_{r,1} - \omega_{l,1} - \omega_{r,2} + \omega_{l,2})}{w} \quad \text{(Eq. 12)}$$

Using these errors, a PID control law can be defined:

$$u = K_p e + K_I \int e \, dt + K_D \dot{e} \quad \text{(Eq. 13)}$$

where u is the commanded angular velocity of the rear module, and $K_p$, $K_I$, and $K_D$ are the proportional, integral and derivative gains, respectively. The angular position error in Eq. 13 can be numerically integrated with sufficient anti-windup included in the software implementation. Both a forward velocity and angular velocity are needed to determine the right and left wheel commands. The angular velocity command is determined by the PID controller (FIG. 18, block 1040). The robot geometry constrains the forward speed of the second module, since there is no compliance in the yaw linkage. Hence, the magnitudes of the forward velocities of both modules must remain the same so they stay connected. Therefore:

$$v_{x,2c} = v_{x,1c} \quad \text{(Eq. 14)}$$

This is the kinematic constraint used at block 1050. The left and right rear motor speed commands, $\omega_{2,r,c}$ and $\omega_{2,l,c}$, can be determined by:

$$\begin{bmatrix} \omega_{2,r,c} \\ \omega_{2,l,c} \end{bmatrix} = \begin{bmatrix} 1/r_w & w/2r_w \\ 1/r_w & -w/2r_w \end{bmatrix} \begin{bmatrix} V_{x,2c} \\ u \end{bmatrix} \quad \text{(Eq. 15)}$$

The robot geometry imposes limits on its permissible trajectories. The yaw joint has a range of (−45/45) degrees, which restricts the robot's ability to maneuver in a tight circle. Hence, there is a minimum instantaneous center of rotation that limits the difference between the right and left motor speeds. This constraint is found by substituting the maximum range into Eq. 10 and rearranging:

$$|\omega_r - \omega_l| < \frac{\pi w(\omega_{r1} + \omega_{l1})}{8(d_1 + d_2)} \quad \text{(Eq. 16)}$$

A model of the system dynamics is needed to emulate its behavior when testing the leader-follower PID controller in simulation. Assume that the magnetic force between the wheels and the planar surface the robot travels on acts orthogonally to the robot motion. The following state model can be derived from first principles:

$$M(q)\dot{v} + H(v,q) + P(q)v = Bu \quad \text{(Eq. 17)}$$

where v is the state vector, M (q) is the mass matrix, vector H (v, q) contains centripetal terms, P (q) is the dissipative matrix, B is the input matrix, and u is the control vector. The state vector v is defined as $$V = [\omega_{r1}\omega_{l1}\omega_{r2}\omega_{l2}i_{r1}i_{l1}i_{r2}i_{l2}]^T \quad \text{(Eq. 18)}$$

where i is the motor current. The system inputs are the voltages applied to the motors:

$$u = [V_{r1}V_{l1}V_{r2}V_{l2}]^T \quad \text{(Eq. 19)}$$

Figure 19:
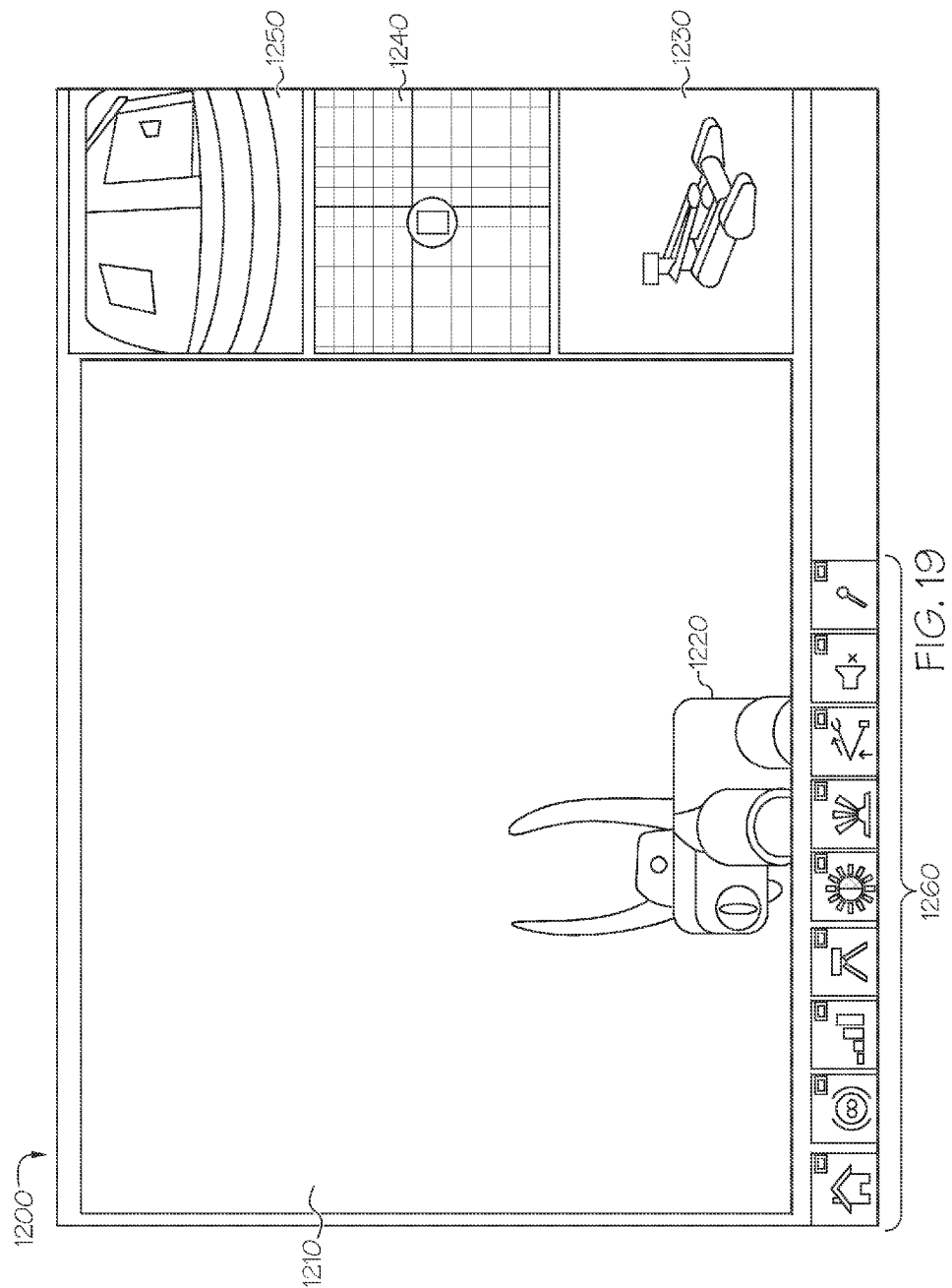
FIG. 19 shows a diagram illustrating an operator control unit graphical user interface that may be used to control a system in accordance with the Multi-Segmented Magnetic Robot.

FIG. 19 shows a diagram illustrating an operator control unit (OCU) graphical user interface (GUI) 1200 that may be used to control a system in accordance with the Multi-Segmented Magnetic Robot. OCU GUI 1200 may include several windows in a display, such as a main window 1210 for camera input from the system 1220, a first sub-window 1230 showing the orientation of the system, a second sub-window 1240 showing a map of the location of the system, and a third sub-window 1250 showing input from a system sensor. The OCU GUI may also contain a plurality of user controls 1260 to provide the user with various functionalities with regard to operating the system.

Operator control software may run on a portable device, such as a laptop or tablet, and provides the command and control interface for directing the system and receiving information back from the system. As an example, driver module software may run using Linux on a Gumstix® Overo Fire COM within each driver module. A wireless capability provided by the Overo Fire COM may be used for communication between driver modules and the OCU. Software on the system executes low-level tasks and communications such as battery-level reporting, motor control, and sensor-data routing. Motor control software provides basic movement commands from the OCU via the Overo processor to the motor controllers.

The OCU may comprise a portable device, such as a laptop or tablet, with the Microsoft® Windows operating system and multi-robot operator control unit (MOCU) application software. Used for controlling a wide variety of unmanned systems, MOCU is modular and scalable so it can be used with both existing and future platforms. The modularity has been extended to the user interface as well, making it possible to create the full gamut of user interfaces, ranging from headless to tiled windows to completely immersive game-like displays.

While the modules are used primarily for interfacing to different protocols, specialized hardware, video decoding and the like, most of the user interface is defined in Extensible Markup Language (XML) configuration files, making it relatively easy to customize what the display looks like and how the user interacts with the system, whether this be via mouse, keyboard, touchscreen, joystick, or other input devices. Control of the system through a MOCU will provide video feedback and joystick control for the system. In some embodiments, feedback from new sensors, battery life, robot pose, and other relevant information and control interfaces may be included.

Figure 20:
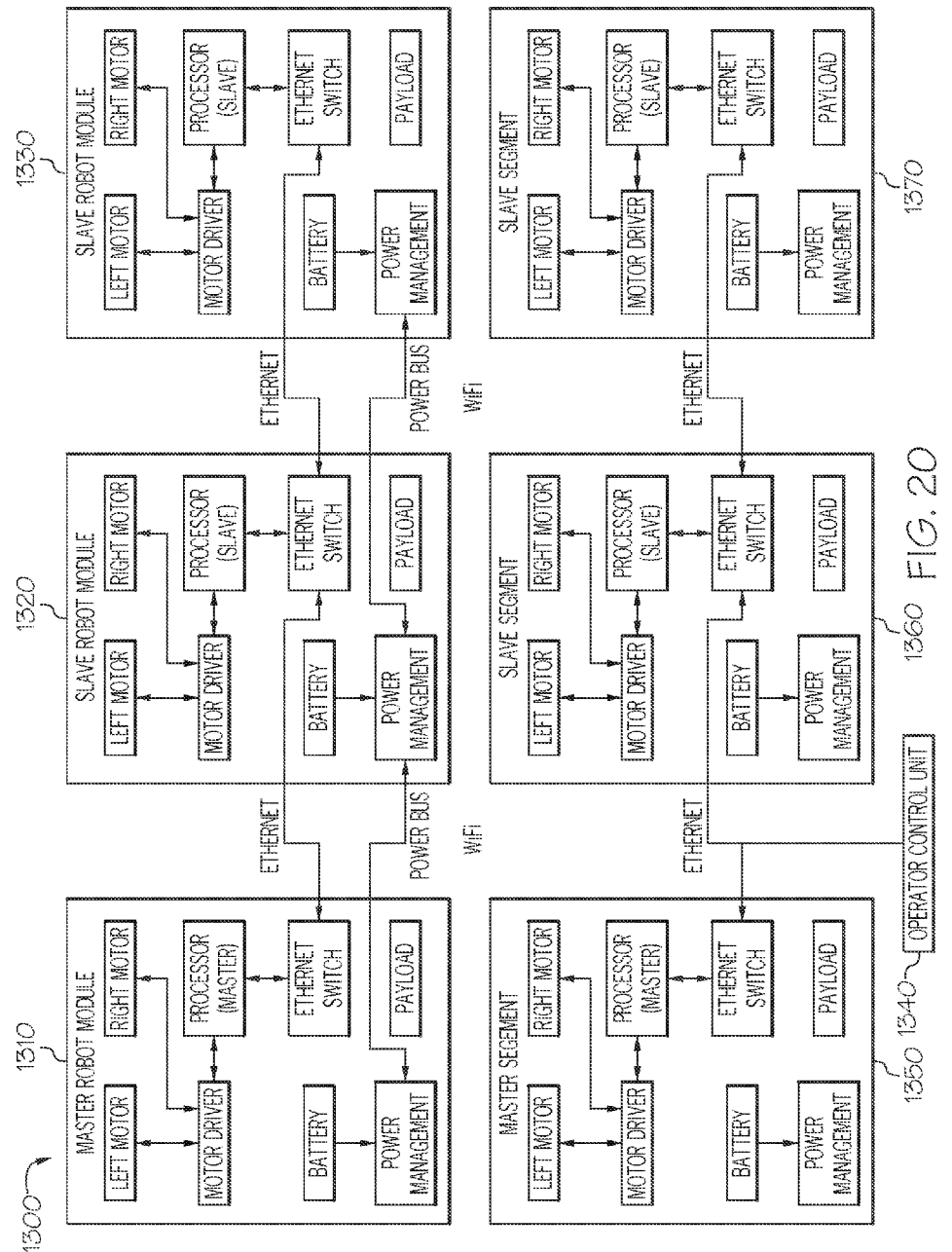
FIG. 20 shows a block diagram illustrating an electronics/communications architecture that may be used on a system in accordance with the Multi-Segmented Magnetic Robot.

FIG. 20 shows a block diagram 1300 illustrating an electronics/communications architecture that may be used on a system in accordance with the Multi-Segmented Magnetic Robot. The electronics/communications may be divided into separate modules, such as a master system module and slave system modules, the number of which depends on the number of slave modules. The electronics used in the embodiments of the systems disclosed herein can be grouped in to four major categories: power, communication, sensing, and output. Feedback sensors such as motor encoders, joint encoders, and stereo vision pose sensors are not illustrated. The power group consists of the wires, battery, and circuitry to manage and distribute power throughout the system. The processing group consists of the processor, radio, circuitry, and wires to distribute communications. The sensing group includes the wheel encoders, linkage encoders, camera, and future payloads that may be added to gather information. The output group consists of the motors and motor drivers.

Each Segment has its own processor and ability to send feedback and other information to other segments to coordinate mobility over an Ethernet link. Wireless and wired links may be used. As shown, master module 1310 is connected to slave modules 1320 and 1330 via an Ethernet link. Further, the power management systems of modules 1310, 1320, and 1330 may be connected via a power bus. Also shown, an OCU 1340 is connected to master segment 1350 and slave segments 1360 and 1370 via an Ethernet link.

Many modifications and variations of the Multi-Segmented Magnetic Robot are possible in light of the above description. Within the scope of the appended claims, the embodiments of the systems described herein may be practiced otherwise than as specifically described. The scope of the claims is not limited to the implementations and the embodiments disclosed herein, but extends to other implementations and embodiments as may be contemplated by those having ordinary skill in the art.

We claim:

1. A system comprising:
   a first drive module connected to a first end of a linkage arm and a second drive module connected to a second end of the linkage arm, wherein the first drive module and the second drive module each have a motor assembly and a motor controller therein; and
   two magnetic wheels connected to each of the first drive module and the second drive module, wherein the motor assembly and motor controller for each respective drive module provide independent control for each of the two magnetic wheels connected to the respective drive module.

2. The system of claim 1, wherein the linkage arm is rigid.

3. The system of claim 1, wherein the first drive module and the second drive module are independently controlled using a coordinated controller.

4. The system of claim 1, wherein the linkage arm comprises a first linkage arm portion having at least one degree of freedom with respect to a connected second linkage arm portion.

5. The system of claim 4, wherein the at least one degree of freedom is provided by a hinged connection between the first linkage arm portion and the second linkage arm portion.

6. The system of claim 5, wherein the hinged connection allows the first and the second linkage arm portions to move laterally with respect to the orientation of the linkage arm in relation to the first and second drive modules.

7. The system of claim 5, wherein the hinged connection is made using a spring hinge.

8. The system of claim 4, wherein the at least one degree of freedom is provided by a ball joint connection between the first linkage arm portion and the second linkage arm portion.

9. The system of claim 1, wherein at least one end of the linkage arm has at least one degree of freedom with respect to its respectively connected drive module.

10. The system of claim 9, wherein the at least one degree of freedom is obtained by connection of at least one end of the linkage arm to its respectively connected drive module using a roll shaft.

11. The system of claim 1 further comprising:
a second linkage arm connected at a first end of the second linkage arm to one of the first and the second drive modules; and
a third drive module connected to a second end of the second linkage arm, wherein the third drive module is controlled independently of the first and the second drive modules.

12. The system of claim 11, wherein the second linkage arm has at least one degree of freedom with respect to the third drive module.

13. The system of claim 1, wherein the linkage arm has an arched shape.

14. The system of claim 1, wherein the linkage arm comprises a flexible material.

15. A system comprising:
a first drive module connected to a first end of a linkage arm and a second drive module connected to a second end of the linkage arm, wherein the first drive module and the second drive module each have a motor assembly and a motor controller therein, wherein the linkage arm comprises a first linkage arm portion having at least one degree of freedom with respect to a connected second linkage arm portion, wherein at least one end of the linkage arm has at least one degree of freedom with respect to its respectively connected drive module; and
two magnetic wheels connected to each of the first drive module and the second drive module, wherein the motor assembly and motor controller for each respective drive module provide independent control for each of the two magnetic wheels connected to the respective drive module.

16. The system of claim 15, wherein the at least one degree of freedom is provided by a hinged connection between the first linkage arm portion and the second linkage arm portion.

17. The system of claim 15, wherein the at least one degree of freedom is obtained by connection of at least one end of the linkage arm to its respectively connected drive module using a roll shaft.

18. The system of claim 15 further comprising:
a second linkage arm connected at a first end of the second linkage arm to one of the first and the second drive modules; and
a third drive module connected to a second end of the second linkage arm, wherein the third drive module is controlled independently of the first and the second drive modules, wherein the second linkage arm has at least one degree of freedom with respect to the third drive module.

19. A system comprising:
a first drive module connected to a first end of a first linkage arm and a second drive module connected to a second end of the first linkage arm;
a second linkage arm connected at a first end of the second linkage arm to the second drive module and connected at a second end of the second linkage arm to a third drive module, wherein the first, the second, and the third drive modules are independently controlled; and
two magnetic wheels connected to each of the first, the second, and the third drive modules.

20. The system of claim 19, wherein the at least one degree of freedom is obtained by connection of at least one end of the first linkage arm to its respectively connected drive modules using a roll shaft and at least one degree of freedom is obtained by connection of at least one end of the second linkage arm to its respectively connected drive modules using a roll shaft.

\* \* \* \* \*